United States Patent [19]

O'Reilly et al.

[11] 4,074,331

[45] Feb. 14, 1978

[54] MAGNETIC RECORDING HEAD STRUCTURE FOR RECORDING ON BOTH SIDES OF A RECORD MEMBER

[75] Inventors: James Michael O'Reilly, Tillicoultry; Alexander Smith Murison, Kirkcaldy, both of Scotland

[73] Assignee: Burroughs Corporation, Detroit, Mich.

[21] Appl. No.: 728,804

[22] Filed: Oct. 1, 1976

[30] Foreign Application Priority Data

Oct. 3, 1975 United Kingdom ............... 40492/75

[51] Int. Cl.² .............................................. G11B 5/48
[52] U.S. Cl. ..................................... 360/104; 360/130
[58] Field of Search ........ 360/104, 103, 105, 119–122, 360/135, 97–99, 130

[56] References Cited

U.S. PATENT DOCUMENTS

| 3,751,603 | 8/1973 | Prieur et al. | 360/105 |
| 3,928,908 | 12/1975 | Case | 360/103 X |

FOREIGN PATENT DOCUMENTS

| 2,301,440 | 7/1973 | Germany | 360/99 |

Primary Examiner—John H. Wolff
Attorney, Agent, or Firm—Robert J. Gaybrick; Benjamin J. Barish; Kevin R. Peterson

[57] ABSTRACT

A magnetic recording head structure having independent read/write heads located on opposite sides of a flexible recording disk to enable the reading and writing of information on both the upper and lower surfaces of the disk. Each read/write head is supported by corresponding cantilever arms connected to a common head positioning carriage. Each read/write head employs a pressure pad positioned on the opposite side of the flexible recording disk to urge the disk into recording contact with the read/write head associated with the pressure pad. The read/write heads are "D" shaped with the bar portions of the "D" shaped heads located adjacent to each other to insure that the heads do not overlap for any portion of the recording disk. The read/write heads include appropriate coil and magnetic core structures to enable the heads to write information onto the disk, read back previously written information from the disk, and erase information that exists on the disk.

3 Claims, 5 Drawing Figures

MAGNETIC RECORDING HEAD STRUCTURE FOR RECORDING ON BOTH SIDES OF A RECORD MEMBER

FIELD OF THE INVENTION

The present invention relates to magnetic recording apparatus, and particularly to apparatus for recording on both sides of a moving record member. The invention is especially useful in a system for magnetically recording and reproducing information with respect to opposite surfaces of a flexible magnetic record disk.

BACKGROUND OF THE INVENTION

Flexible magnetic record disks (sometimes called "floppy disks") are increasingly being used as storage devices in computers and other data processing systems. Such disks can be produced very inexpensively compared to the conventional rigid or hard disks, but as a rule their storage capacity is considerably less because of the smaller size and lower track density normally permitted by their nature. Recording on opposite sides of a flexible magnetic record disk is advantageous in order to increase its storage capacity.

SUMMARY OF THE INVENTION

An object of the present invention is to provide a novel arrangement, and particularly a novel structure of magnetic recording head, which allows closer positioning of the magnetic recording heads on opposite sides of the disk.

According to one aspect of the present invention, there is provided magnetic recording apparatus for recording on opposite sides of a moving record member, comprising: a pair of magnetic recording heads and means for supporting them on opposite sides of the record member; each of the heads including a body member having a face adapted to contact the record member along a record-contacting surface parallel to the direction of movement of the record member; each of the heads further including magnetic core transducer means within the record-contacting surface, each of the recording heads is substantially formed in the shape of a "D" with the center-line of the record-contact surface being eccentrically located in the face, the center-line of the record-contact surface is closer to the straight edge portion of the "D"-shaped head than to the round portion; the two heads being supported on opposite sides of the record member such that the straight edges of the two heads are oriented towards each other with the center-lines of their record-contacting surfaces spaced from each other laterally of the direction of movement of the record member.

The invention is particularly useful in a recording apparatus which employs a pair of pressure pads supported by the supporting means on opposite sides of the record member, each pressure pad being supported adjacent to one head on one side of the record member and aligned with the other head on the opposite side of the record member.

According to another aspect of the invention, there is provided a magnetic recording head comprising a body member having a face adapted to contact a record member along a surface parallel to the direction of movement of the record member; the face being of substantially D-shape with the center line of its record-contacting surface being adjacent to and parallel to the straight bar of the "D"; and magnetic core transducer means disposed within the record-contacting surface; the magnetic core transducer means comprising a Read/Write magnetic core having a non-magnetic gap and low-friction non-magnetic material aligned with said latter core in the direction of movement in the record member; and a pair of Erase cores having non-magnetic gaps disposed on opposite sides of the low-friction non-magnetic material.

Such a construction is particularly useful with respect to apparatus for recording on both sides of a flexible disk in that it permits a closer spacing of the heads.

The invention is herein described, by way of example only, with reference to the accompanying drawings, wherein.

Figure 1:
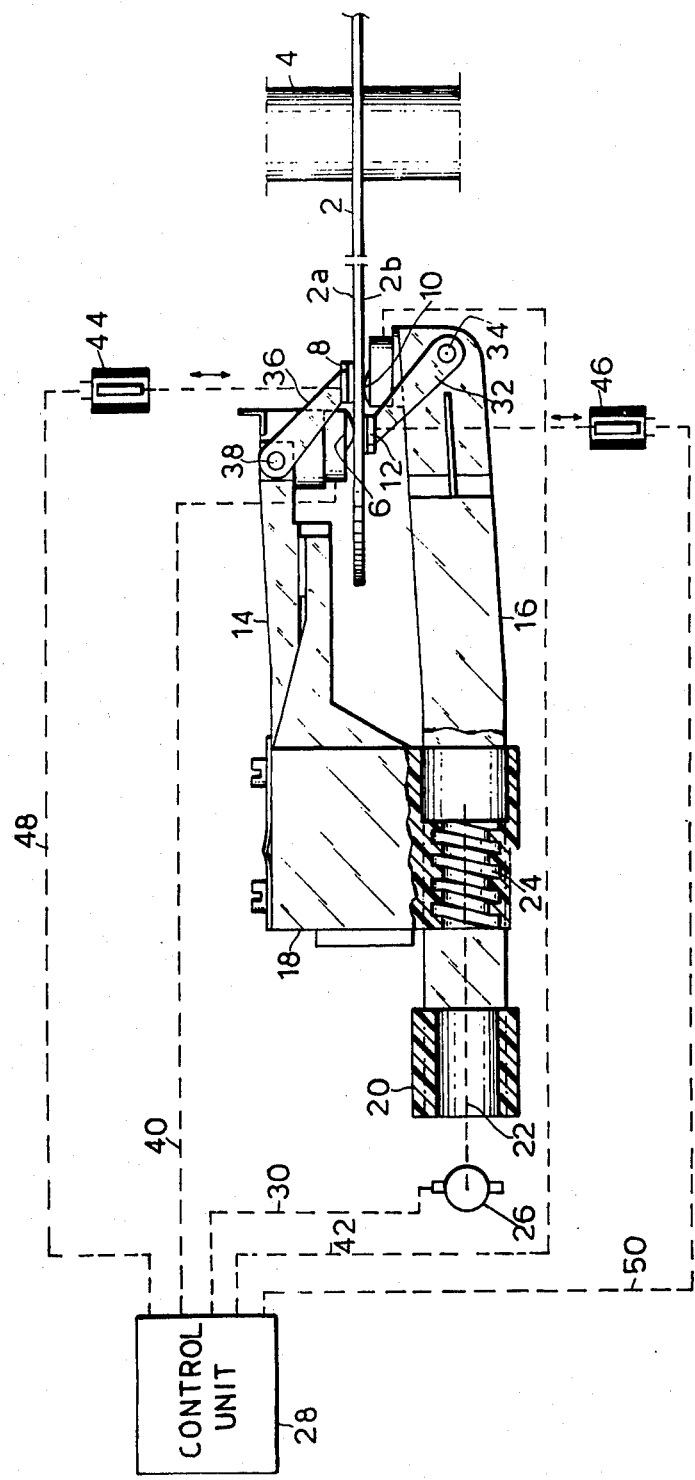
FIG. 1 illustrates one application of the invention for recording on opposite sides of a flexible magnetic record disk.

FIG. 1 illustrates the use of the present invention in apparatus for magnetically recording and reproducing information with respect to opposite surfaces of a flexible magnetic record disk. As shown in FIG. 1, the disk 2 is rotated on a spindle 4 between one magnetic head 6 and pressure pad 8 cooperable with one surface 2a of the disk, and a second head 10 and pressure pad 12 cooperable with the opposite surface 2b of the disk. The two magnetic heads 6, 10 and the two pressure pads 8, 12 are supported by a pair of cantilever arms 14, 16 on a carriage block 18, head 6 being aligned with pressure pad 12, and head 10 being aligned with pressure pad 8. The carriage block 18 is formed with a bored end 20 which receives a screw drive 22 cooperating with a nut 24 formed within the carriable block, screw 22 being drived by a motor 26 to move the magnetic heads 6, 10 radially inwardly or outwardly with respect to the flexible disk 2 in order to select a recording track thereon.

A control unit 28 controls motor 26 via line 30. This control unit further controls pressure pads 8 and 12, the latter being supported by bails 32, 36, respectively, pivoted on pins 34 and 38, each pressure pad being spring-urged towards the record disk but being pivoted away therefrom by the selective energization of a pair of solenoids 44, 46 controlled from the control unit 28 via lines 48, 50. The control unit also selects, via lines 40, 42, the magnetic head to be operative to record or reproduce from its respective side of the record disk.

The arrangement is such that if record head 6 is selected to be the operative one for recording on face 2a of the record disk, solenoid 44 is actuated to pivot pressure pad 8 away from the disk, whereby pressure pad 12, being spring-urged toward the operative head 6, presses the flexible disk against it; and if record head 10 is to be the operative one, pressure pad 12 is pivoted away from the disk by its solenoid 46 leaving pressure pad 8 spring-urged towards head 10 to press the disk against that head.

The present invention is directed particularly to the structure of the recording heads 6 and 10 which, among other advantages, allows their closed spacing to each other and thereby enables a higher track density on the record disk. The novel structure of the record head is particularly illustrated in FIGS. 2–5. The head is therein identified as 60, but it will be appreciated that head 60 of these figures corresponds to both heads 6 and 10 in the system of FIG. 1.

Figure 2:
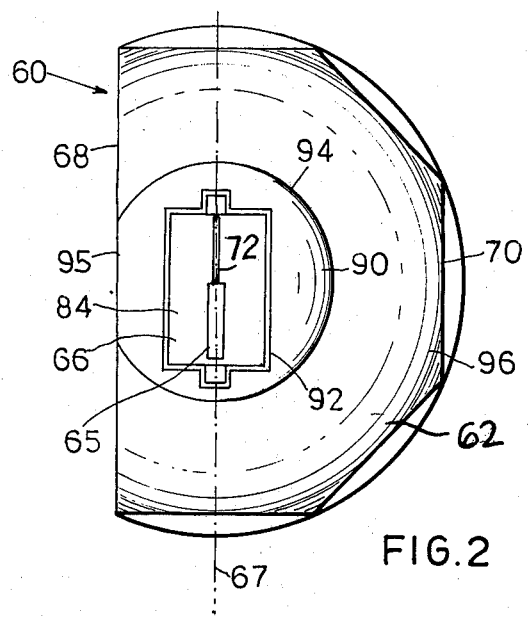
FIG. 2 is an enlarged plane view of the record-contacting face of one of the recording heads used in the system of FIG. 1.
Figure 4:
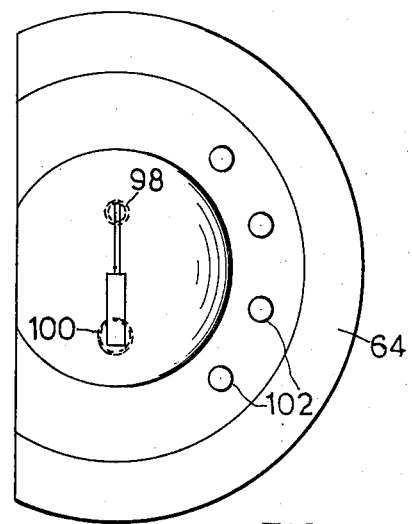
FIG. 4 is a plane view of the face of the recording head opposite to that of FIG. 2.
Figure 3:
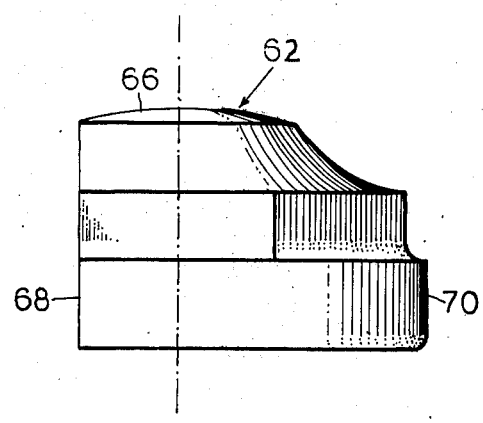
FIG. 3 is a side elevational view of the recording head of FIG. 2.

FIG. 2 illustrates the disk-contacting face 62 of the recording head, and FIG. 4 illustrates the opposite face 64. It will be seen that both faces are substantially of D-shape. The magnetic core transducer means 65 is disposed within a record-contacting surface 66 on face 62. The center-line 67 of record-contacting surface 66 is eccentrically located on face 62, being closer to the straight-bar edge 68 of the "D" then the opposite edge 70.

Figure 5:
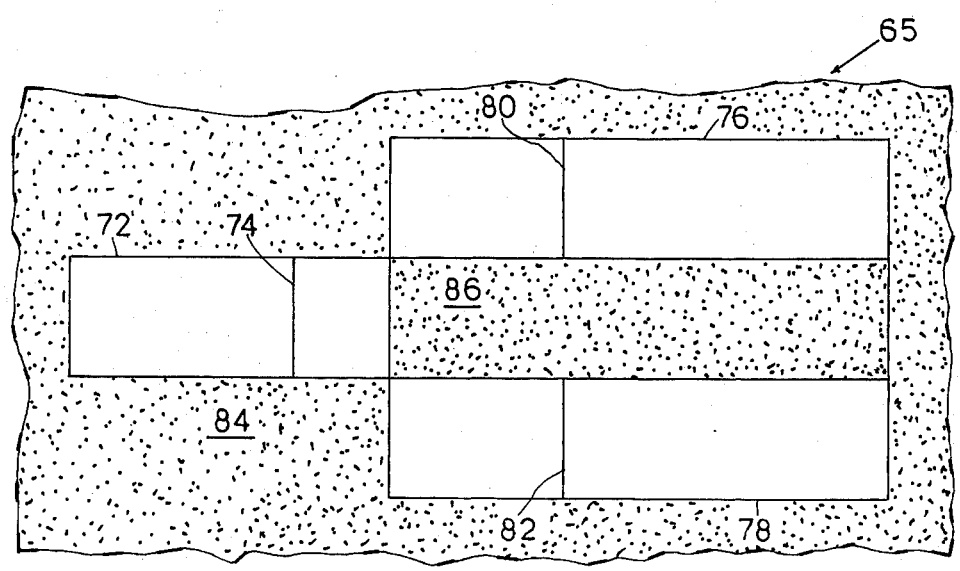
FIG. 5 is an enlarged fragmentary view illustrating the arrangement of the Read/Write and Erase cores in the head of FIG. 2.

The magnetic core transducer means 65 within the record-contacting surface 66 is more particularly shown in FIG. 5. It includes a Read/Write core 72 having a magnetic gap 74, and a pair of Erase cores 76, 78, having magnetic gaps 80, 82. All three cores are embedded within a body of low-friction non-magnetic material 84 (FIGS. 2, 5) such that the latter material encloses all three cores and also occupies a space, as shown at 86 in FIG. 5, between the two Erase cores 76, 78, and in alignment with the Read/Write core 72 in the direction of movement of the record disk (2, FIG. 1).

The transducer unit 65 embedded within the ceramic material 84 is bonded to the head body of insulation material 90 by an adhesive 92, and the latter body is enclosed within a magnetic shield 94. The latter shield is substantially circular in shape but includes a straight line portion 95 corresponding to the straight edge 68 of the head itself. Shield 92 is enclosed within another body 96 of insulation material.

As one example, the magnetic cores may be of ferrite, the low-friction non-magnetic material 84 and 86 may be ceramic, the shield 92 may be of Mu-metal, the insulating material of body portions 90 and 96 may be of polycarbonate, and the adhesive 92 may be an epoxy resin.

FIG. 4 illustrates the field-inducing coils for the cores, these being core 98 for the Read/Write core 72, and coil 100 for the two Erase cores 76, 78. Also illustrated in FIG. 4 are the coil connector posts 102.

In use, two heads are disposed on opposite sides of the record disk (as shown by heads 6, 10 and disk 2, FIG. 1) such that their straight edges 68 face each other and the center-lines 67 of their record-contacting surfaces 66 are spaced from each other laterally of the direction of movement of the record disk. The center-line 67 of the record-contacting surface 66 of each head is thus eccentric with respect to the head, being spaced closer to its straight edge 68 than to its opposite edge 70. This arrangement enables the two heads to be disposed on opposite sides of the record disk at a very close spacing thereby enabling recording at a relatively high track density on opposite sides of the disk.

Many variations, modifications and other applications of the illustrated embodiment can be derived from the foregoing material and it is intended that such material be taken as illustrative only and not in a limiting sense, the scope of the invention is defined in the claims.

What is Claimed is:

1. A magnetic recording head assembly for recording information on opposite surfaces of a flexible record member comprising:

a pair of magnetic recording heads, each said recording head having a recording face adapted to contact a surface of the record member, said recording faces being of substantially D-shape and having a magnetic core transducer means eccentrically disposed thereon adjacent to and parallel to the straight bar of the "D", each of said magnetic core transducer means comprising a read/write core having a non-magnetic gap and low friction non-magnetic material aligned with the read/write magnetic core and a pair of erase cores having non-magnetic gaps disposed on opposite sides of the low-friction non-magnetic material;

means for supporting and positioning one of said pair of magnetic recording heads adjacent to one of the surfaces of said flexible record member and the other of said pair of magnetic recording heads adjacent to the opposite surface of the record member with the straight bar portions of said recording heads being parallel to and in close proximity to each other on opposite sides of said flexible record member; and a pair of pressure pads supported by said positioning and supporting means on opposite sides of the flexible record member, each of said pressure pads being in registry with an associated magnetic recording head located on the opposite side of the flexible record member, each of said pressure pads adapted to bias the flexible record member into cooperative relationship with its associated magnetic recording head, said pressure pads being positioned closely adjacent to the straight bar portion of the magnetic recording head that is located on the same side of the flexible record member whereby the D-shape of the magnetic recording heads enables the compact arrangement of a pair of magnetic recording heads and their associated pressure pads.

2. The magnetic recording head assembly of claim 1 wherein said magnetic core transducer means is embedded in low-friction, non-magnetic material and is enclosed in a magnetic shield.

3. The magnetic recording head of claim 2 wherein said low-friction, non-magnetic material is ceramic and said magnetic core transducer means is of ferrite.

* * * * *